(12) United States Patent
Maeda et al.

(10) Patent No.: US 10,089,559 B2
(45) Date of Patent: Oct. 2, 2018

(54) SCANNER, IMAGE FORMING APPARATUS, AND SCANNING METHOD

(71) Applicants: Katsuhiko Maeda, Kanagawa (JP); Takuma Nishio, Kanagawa (JP); Yuugo Matsuura, Kanagawa (JP)

(72) Inventors: Katsuhiko Maeda, Kanagawa (JP); Takuma Nishio, Kanagawa (JP); Yuugo Matsuura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 78 days.

(21) Appl. No.: 15/062,532

(22) Filed: Mar. 7, 2016

(65) Prior Publication Data
US 2016/0275381 A1    Sep. 22, 2016

(30) Foreign Application Priority Data

Mar. 18, 2015  (JP) ................. 2015-055215

(51) Int. Cl.
G06K 15/12 (2006.01)
H04N 1/10 (2006.01)
H04N 1/40 (2006.01)

(52) U.S. Cl.
CPC ........... G06K 15/1209 (2013.01); H04N 1/10 (2013.01); H04N 1/40037 (2013.01)

(58) Field of Classification Search
None
See application file for complete search history.

(56) References Cited

U.S. PATENT DOCUMENTS

| | | |
|---|---|---|
| 6,137,518 A | 10/2000 | Maeda |
| 6,249,304 B1 | 6/2001 | Sawayama et al. |
| 6,292,206 B1 | 9/2001 | Takehara et al. |
| 2001/0028387 A1 | 10/2001 | Maeda |
| 2003/0001945 A1 | 1/2003 | Maeda |
| 2003/0030718 A1 | 2/2003 | Maeda |
| 2004/0070661 A1 | 4/2004 | Maeda |
| 2004/0095454 A1 | 5/2004 | Maeda |
| 2004/0160506 A1 | 8/2004 | Maeda |

(Continued)

FOREIGN PATENT DOCUMENTS

| | | |
|---|---|---|
| JP | 2002-292929 | 10/2002 |
| JP | 2013-175851 | 9/2013 |

OTHER PUBLICATIONS

U.S. Appl. No. 14/797,503, filed Jul. 13, 2015.

*Primary Examiner* — Jennifer D. Carruth
(74) *Attorney, Agent, or Firm* — Oblon, McClelland, Maier & Neustadt, L.L.P.

(57) ABSTRACT

A scanner includes: an acquiring unit that acquires determination result information based on a determination result of whether a target dot of a target pixel of a plurality of pixels constituting image data is a first dot or a second dot; a light source control unit that, if the target dot is the first dot, causes a light source to emit a light beam during a corrected lighting time with a light source characteristic time based on a characteristic of the light source being added to a predetermined lighting time that is preliminarily determined with respect to the target dot, and if the target dot is the second dot, causes the light source to emit a light beam during the predetermined lighting time; and a deflecting unit that deflects the light beam in the main scanning direction.

13 Claims, 9 Drawing Sheets

(56) References Cited

U.S. PATENT DOCUMENTS

| | | |
|---|---|---|
| 2004/0239747 A1 | 12/2004 | Maeda |
| 2005/0184229 A1 | 8/2005 | Maeda |
| 2005/0200689 A1 | 9/2005 | Shinohara et al. |
| 2006/0045577 A1 | 3/2006 | Maeda |
| 2006/0164505 A1 | 7/2006 | Maeda |
| 2006/0176363 A1 | 8/2006 | Maeda |
| 2006/0187473 A1 | 8/2006 | Maeda |
| 2007/0097201 A1 | 5/2007 | Kanzaki et al. |
| 2007/0210245 A1 | 9/2007 | Maeda |
| 2007/0217831 A1 | 9/2007 | Maeda |
| 2007/0263270 A1 | 11/2007 | Komai et al. |
| 2008/0084571 A1 | 4/2008 | Maeda |
| 2008/0273902 A1 | 11/2008 | Maeda |
| 2010/0238261 A1 | 9/2010 | Maeda |
| 2011/0228030 A1 | 9/2011 | Maeda |
| 2014/0063168 A1 | 3/2014 | Maeda et al. |
| 2014/0072317 A1 | 3/2014 | Shukuya et al. |
| 2015/0054902 A1 | 2/2015 | Maeda et al. |
| 2015/0316870 A1 | 11/2015 | Maeda |
| 2016/0275381 A1* | 9/2016 | Maeda ............... G06K 15/1209 |

* cited by examiner

SCANNER, IMAGE FORMING APPARATUS, AND SCANNING METHOD

CROSS-REFERENCE TO RELATED APPLICATIONS

The present application claims priority to and incorporates by reference the entire contents of Japanese Patent Application No. 2015-055215 filed in Japan on Mar. 18, 2015.

BACKGROUND OF THE INVENTION

1. Field of the Invention

The present invention relates to a scanner, an image forming apparatus, and a scanning method.

2. Description of the Related Art

Such a scanner has been known that scans a photoconductor and the like with a light beam while controlling emission of the light beam output from a light source such as a semiconductor laser diode (LD) based on a dot of each pixel composing image data.

With such a scanner, techniques have been known that, if a target dot has a neighboring dot, move the target dot close to the neighboring dot and make successive dots (for example, see Japanese Patent Application Laid-open No. 2013-175851).

Laser diodes, however, take a time to light and to output a light beam after current is applied thereto (in other words, an oscillation delay is caused). If a target dot is an isolated dot without neighboring dots, the oscillation delay shortens the lighting time of the laser diode (the luminescent time of a light beam) by the amount of the oscillation delay. If the target dot is a successive dot, the laser diode continuously lights. The laser diode is therefore not affected by the oscillation delay, and the lighting time is less likely to be shortened.

As described above, even with an identical target dot, if a laser diode has a different lighting time depending on whether the dot is an isolated dot or a successive dot, the difference affects the image quality.

For example, Japanese Patent Application Laid-open No. 2002-292929 describes a technique to modulate power and equalize the amount of exposure of a light beam between an isolated dot and a successive dot.

Such a conventional technique, however, does not solve the problem that, even with an identical target dot, a light source may have a different lighting time depending on whether the target dot is an isolated dot or a successive dot. This problem may cause a tone jump.

Therefore, it is desirable to provide a scanner, and an image forming apparatus, and a scanning method capable of improving the gradation of an image.

SUMMARY OF THE INVENTION

It is an object of the present invention to at least partially solve the problems in the conventional technology.

According to an aspect of the present invention, there is provided a scanner including: an acquiring unit that acquires determination result information based on a determination result of whether a target dot of a target pixel of a plurality of pixels constituting image data is a first dot that needs emission of a light beam from a light source with none of neighboring pixels adjacent in a main scanning direction having a neighboring dot that needs emission of a light beam from the light source, or a second dot that needs emission of a light beam from the light source with at least one of neighboring dots of the neighboring pixels needing emission of a light beam from the light source, and is moved close to the neighboring dot; a light source control unit that, if the target dot is the first dot, causes the light source to emit a light beam during a corrected lighting time with a light source characteristic time based on a characteristic of the light source being added to a predetermined lighting time that is preliminarily determined with respect to the target dot, and if the target dot is the second dot, causes the light source to emit a light beam during the predetermined lighting time; and a deflecting unit that deflects the light beam in the main scanning direction.

According to another aspect of the present invention, there is provided a scanning method performed by a scanner, including: acquiring determination result information based on a determination result of whether a target dot of a target pixel of a plurality of pixels constituting image data is a first dot that needs emission of a light beam from a light source with none of neighboring pixels adjacent in a main scanning direction having a neighboring dot that needs emission of a light beam from the light source, or a second dot that needs emission of a light beam from the light source with at least one of neighboring dots of the neighboring pixels needing emission of a light beam from the light source, and is moved close to the neighboring dot; if the target dot is the first dot, causing the light source to emit a light beam during a corrected lighting time with a light source characteristic time based on a characteristic of the light source being added to a predetermined lighting time that is preliminarily determined with respect to the target dot, and if the target dot is the second dot, causing the light source to emit a light beam during the predetermined lighting time; and deflecting the light beam in the main scanning direction.

According to still another aspect of the present invention, there is provided a scanner including: acquiring means for acquiring determination result information based on a determination result of whether a target dot of a target pixel of a plurality of pixels constituting image data is a first dot that needs emission of a light beam from a light source with none of neighboring pixels adjacent in a main scanning direction having a neighboring dot that needs emission of a light beam from the light source, or a second dot that needs emission of a light beam from the light source with at least one of neighboring dots of the neighboring pixels needing emission of a light beam from the light source, and is moved close to the neighboring dot; light source control means for, if the target dot is the first dot, causing the light source to emit a light beam during a corrected lighting time with a light source characteristic time based on a characteristic of the light source being added to a predetermined lighting time that is preliminarily determined with respect to the target dot, and if the target dot is the second dot, causing the light source to emit a light beam during the predetermined lighting time; and deflecting means for deflecting the light beam in the main scanning direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiment of a scanner and an image forming apparatus according to the present invention will now be described in detail with reference to the accompanying drawings.

Figure 1:
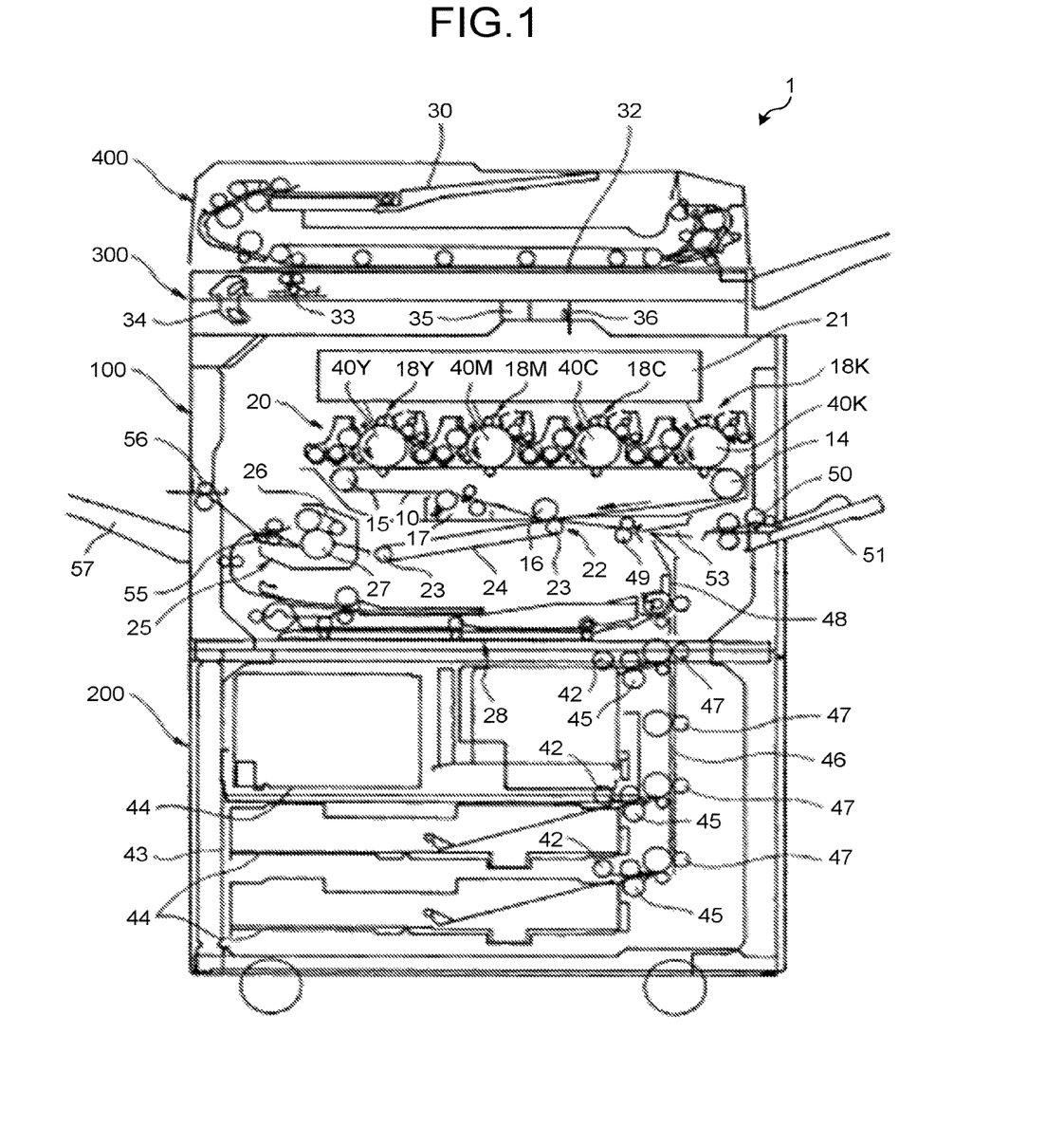
FIG. 1 is a schematic drawing that illustrates an exemplary configuration of an image forming apparatus of an embodiment.

FIG. 1 is a schematic drawing that illustrates an exemplary configuration of an image forming apparatus 1 of an embodiment.

A printer 100 of the image forming apparatus 1 includes an intermediate transfer unit in its center portion. The intermediate transfer unit has an intermediate transfer belt 10, which is an endless belt. The intermediate transfer belt 10 is laid on three support rollers 14, 15, and 16 so as to go round thereon by rotary driving clockwise. A cleaning unit 17 for removing residual toner remaining on the intermediate transfer belt 10 after an image transfer is disposed beside the support roller 15.

An image formation device 20 is disposed on the intermediate transfer belt 10. The image formation device 20 has, along the direction in which the belt moves, photoconductor units 40 in respective colors of yellow (Y), magenta (M), cyan (C), and black (K), a charging unit, a developing unit, and a cleaning unit. The image formation device 20 is installed to the printer 100 in an attachable and detachable manner. A scanner 21 that irradiates photoconductor drums of the photoconductor units in respective colors with laser light for forming an image is disposed above the image formation device 20.

A secondary transfer unit 22 is disposed under the intermediate transfer belt 10. The secondary transfer unit 22 is configured with an endless secondary transfer belt 24 suspended between two rollers 23. The secondary transfer unit 22 pushes up the intermediate transfer belt 10 and presses the intermediate transfer belt 10 against the support roller 16. The secondary transfer belt 24 transfers an image formed on the intermediate transfer belt 10 on the recording sheet.

A fixing unit 25 for fixing an image transferred on the recording sheet is disposed beside the secondary transfer unit 22. The recording sheet with a toner image transferred thereon is fed into the fixing unit 25. The fixing unit 25 is configured with an endless fixing belt 26 and a heating and pressurizing roller 27 pressed against the fixing belt 26.

A sheet reversing unit 28 is disposed below the secondary transfer unit 22 and the fixing unit 25. The sheet reversing unit 28 reverses the recording sheet that has just formed an image on its front surface so that another image is recorded on its back surface and feeds the recording sheet.

When a start switch of an operation unit is pressed, with a document placed on a document feeding stand 30 of an auto document feeder (ADF) 400, the ADF 400 conveys the document onto a contact glass 32. If no documents are placed on the ADF 400, a scanner of an image reading unit 300 is driven to read a document that is manually placed on the contact glass 32. A first carriage 33 and a second carriage 34 are driven for scanning and reading the document.

Light is emitted from a light source on the first carriage 33 onto a contact glass. Reflected light from the surface of the document is reflected by a first mirror on the first carriage 33 and is directed toward the second carriage 34. The light is thereafter reflected by a mirror on the second carriage 34, whereby an image is formed on a charge coupled device (CCD) 36 serving as a reading sensor through an imaging forming lens 35. Recording data in respective colors of Y, M, C, and K, are generated based on an image signal (image data) acquired by the reading sensor 36.

When a start switch is pressed, a command for outputting an image is issued by a personal computer or the like, or a command for outputting a facsimile is issued, the intermediate transfer belt 10 starts rotary driving. Each unit of the image formation device 20 starts preparing for image formation. Image formation sequence for forming an image in each color is started. An exposure laser modulated based on the recording data of each color is projected on the photoconductor drum of each color. After the image formation process in each color, toner images in the respective colors are superimposed and transferred on the intermediate transfer belt 10 as a piece of image.

A recording sheet is conveyed to the secondary transfer unit 22 in such a timing that the front edge of the recording sheet and the front edge of the toner image simultaneously enter the secondary transfer unit 22. With this process, the toner image formed on the intermediate transfer belt 10 is transferred onto the recording sheet. The recording sheet with the toner image transferred thereon is conveyed to the fixing unit 25, whereby the toner image is fixed on the recording sheet.

Specifically, the recording sheet is conveyed to the secondary transfer unit 22 in the above-described timing after one of paper feeding rollers 42 of a paper feeding table 200 is selected for rotary driving to pull out sheets from one of paper feeding trays 44 disposed in a multi-stage manner in the paper feeding unit 43; and one of the sheets is separated by separating rollers 45 and put into a conveying roller unit 46, conveyed and guided to a conveying roller unit 48 in the printer 100 by conveying rollers 47, and stopped by being made contact with resist rollers 49 in the conveying roller unit 48.

It is noted that the recording sheet can also be fed by being set on a manual paper feeding tray 51. When a recording sheet is set on a manual paper feeding tray 51 by a user, the printer 100 rotates and drives a paper feeding roller 50, separates one of sheets on the manual paper feeding tray 51, pulls the sheet into a manual paper feeding path 53, and stops the sheet by causing the sheet to be in contact with the resist rollers 49.

The recording sheet ejected after undergoing the fixing processing in the fixing unit 25 is guided to ejecting rollers 56 by a switching claw 55 and stacked on a paper ejection tray 57. Alternatively, the recording sheet is guided to the sheet reversing unit 28 by the switching claw 55, reversed therein, and once again guided to a transfer position. The sheet, after an image is recorded on its back surface, is ejected onto the paper ejection tray 57 by the ejecting rollers 56.

The cleaning unit 17 removes residual toner remaining on the intermediate transfer belt 10 after the image transfer, for the next image forming.

Figure 2:
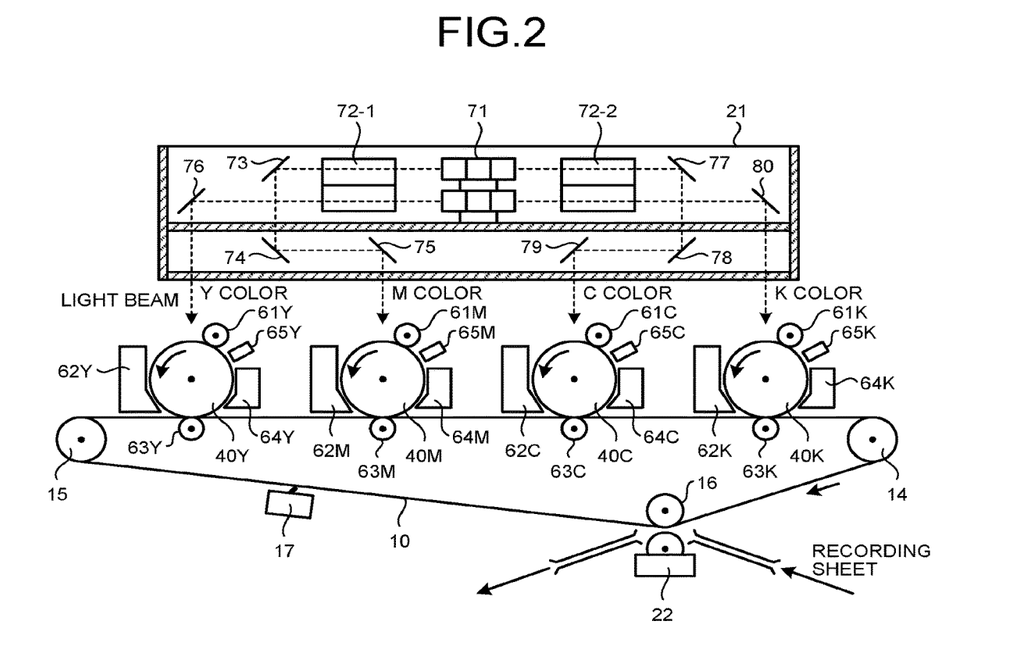
FIG. 2 is a schematic drawing that illustrates exemplary detailed configurations of a scanner and an image transfer mechanism of the image forming apparatus of the embodiment.
Figure 3:
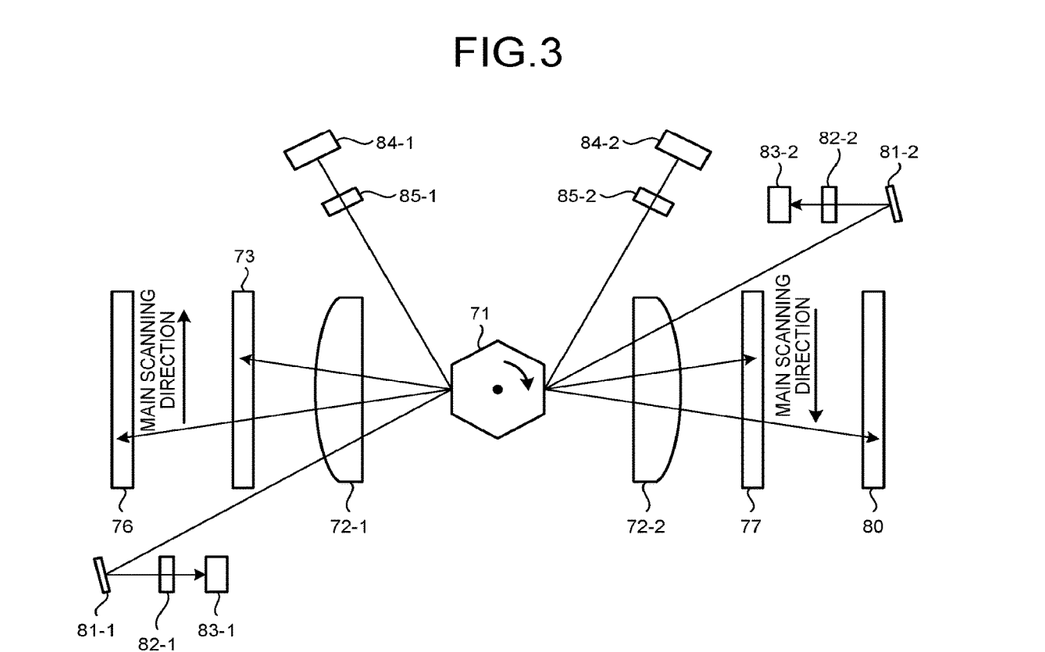
FIG. 3 is a schematic drawing that illustrates an exemplary detailed configuration of the scanner of the embodiment.

FIG. 2 is a schematic drawing that illustrates exemplary detailed configurations of the scanner 21 and an image transfer mechanism of the image forming apparatus 1 of the embodiment. FIG. 3 is a schematic drawing that illustrates an exemplary detailed configuration of the scanner 21 of the embodiment. FIG. 2 is a perspective drawing of the scanner 21 and the image transfer mechanism viewed from the lateral surfaces. FIG. 3 is a perspective drawing of the scanner 21 viewed from the upper surface.

With a polygon mirror 71 (an example of a deflecting unit), the scanner 21 performs deflection scanning of light beams colors of which are different between the upper portion and the lower portion on the surface of the polygon mirror in the main scanning direction. Furthermore, the scanner 21 causes light beams in four colors to be distributed and scanned by opposite mirror surfaces around the polygon mirror 71, so that the light beams scan on the photoconductor units 40 in the respective colors.

The scanner 21 includes LD units 84-1 and 84-2 (examples of a light source) that selectively emit light beams by being driven and modulated according to image data.

A light beam emitted from the LD unit 84-1 passes through a cylinder lens 85-1 and enters the polygon mirror 71 rotated by a polygon motor. The LD unit 84-1 has respective laser diodes (LD) in its upper position and its lower position. A light beam in the M color emitted from the upper portion enters the upper area of the polygon mirror 71, whereas a light beam in the Y color emitted from the lower portion enters the lower area of the polygon mirror 71.

The M-color light beam entering the upper area of the polygon mirror 71 is deflected with the polygon mirror 71 rotating. The deflected M-color light beam passes through an fθ lens 72-1, is reflexed by mirrors 73 to 75, and scans on the photoconductor unit 40M. The Y-color light beam entering the lower area of the polygon mirror 71 is deflected with the polygon mirror 71 rotating. The deflected Y-color light beam passes through the fθ lens 72-1, is reflexed by a mirror 76, and scans on the photoconductor unit 40Y.

A synchronous mirror 81-1, a synchronous lens 82-1, and a synchronous sensor 83-1 are disposed in a writing side-end portion in the main scanning direction, which is situated frontward with respect to the image-writing-start position in a non-image-writing area in the main scanning direction. Respective light beams in colors M and Y passing through the fθ lens 72-1 are reflected by the synchronous mirror 81-1 and collected by the synchronous lens 82-1, and enter the synchronous sensor 83-1. Upon receiving the light beams in colors M and Y, the synchronous sensor 83-1 outputs a synchronous detecting signal that determines a writing-start timing for each color in the main scanning direction.

A light beam emitted from the LD unit 84-2 passes through a cylinder lens 85-2 and enters the polygon mirror 71 rotated by a polygon motor. The LD unit 84-2 has respective laser diodes (LD) in its upper position and its lower position. A light beam in the C color emitted from the upper position enters the upper area of the polygon mirror 71, whereas a light beam in the K color emitted from the lower position enters the lower area of the polygon mirror 71.

The C-color light beam entering the upper area of the polygon mirror 71 is deflected with the polygon mirror 71 rotating. The deflected C-color light beam passes through an fθ lens 72-2, is reflexed by mirrors 77 to 79, and scans on the photoconductor unit 40C. The K-color light beam entering the lower area of the polygon mirror 71 is deflected with the polygon mirror 71 rotating. The deflected K-color light beam passes through the fθ lens 72-2, is reflexed by a mirror 80, and scans on the photoconductor unit 40K.

A synchronous mirror 81-2, a synchronous lens 82-2, and a synchronous sensor 83-2 are disposed in a writing side-end portion in the main scanning direction, which is situated frontward with respect to the image-writing-start position in a non-image-writing area in the main scanning direction. Respective light beams in colors C and K passing through the fθ lens 72-2 are reflected by the synchronous mirror 81-2 and collected by the synchronous lens 82-2, and enter the synchronous sensor 83-2. Upon receiving the light beams in colors C and K, the synchronous sensor 83-2 outputs a synchronous detecting signal that determines a writing-start timing for each color in the main scanning direction.

Charging units 61, developing units 62, transfer units 63, cleaning units 64, and static eliminators 65 are disposed around the respective photoconductor units 40 in colors Y, M, C, and K. Images in colors Y, M, C, and K are transferred in order on the intermediate transfer belt 10 through an ordinary electrophotographic process including charging, exposure, development, and transfer. This process forms a color image where images in four colors are superimposed on the intermediate transfer belt 10. The image formed on the intermediate transfer belt 10 is transferred on the conveyed recording sheet by the secondary transfer unit 22. With this process, a color image with images in four colors superimposed on one another is formed on the recording sheet. The fixing unit (see FIG. 1) fixes the image on the recording sheet.

Figure 4:
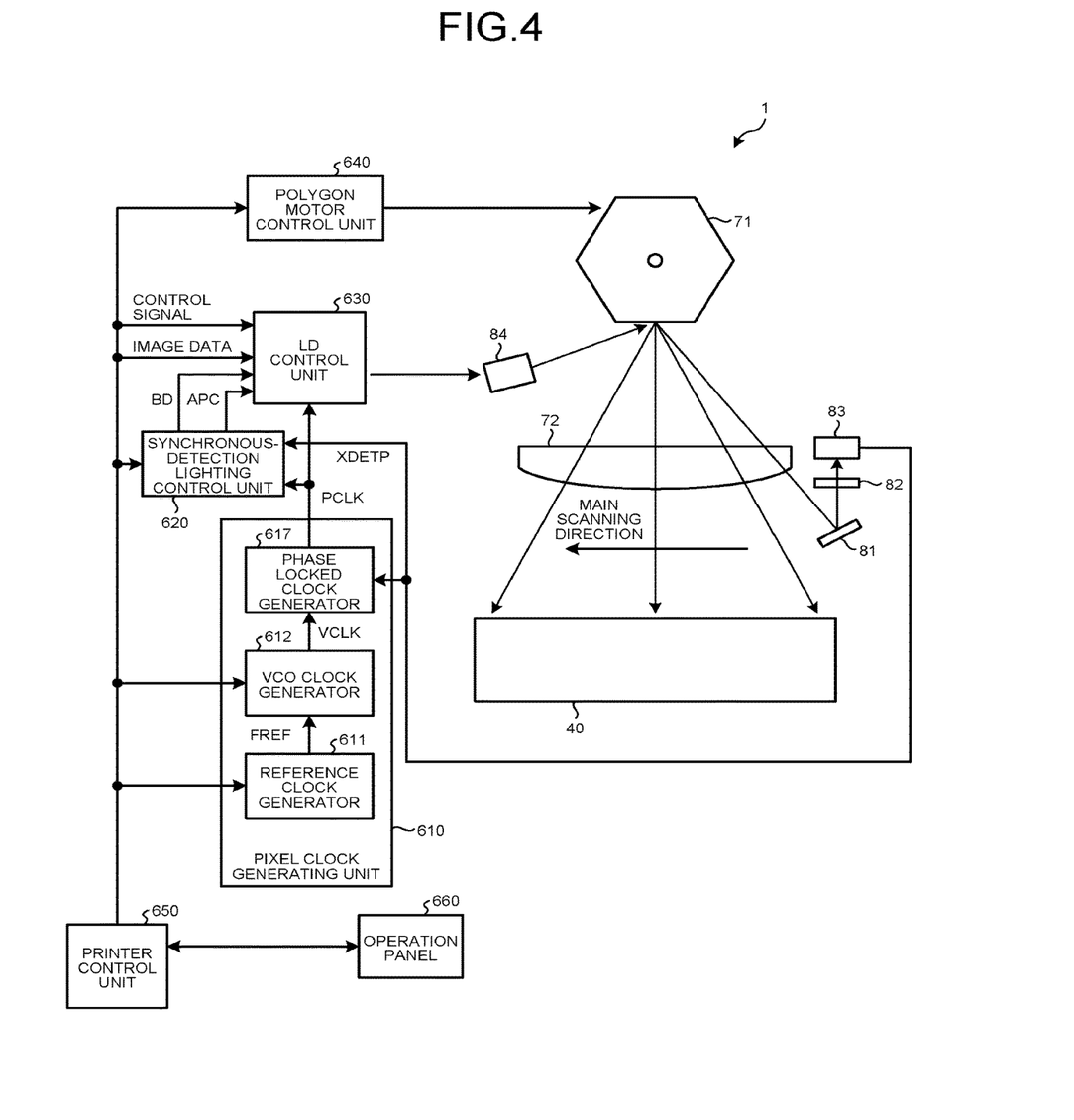
FIG. 4 is a block diagram that illustrates an exemplary electrical configuration of the image forming apparatus of the embodiment.

FIG. 4 is a block diagram that illustrates an exemplary electrical configuration of the image forming apparatus 1 of the embodiment. The example of FIG. 4 illustrates a pixel clock generating unit 610, a synchronous-detection lighting control unit 620, and an LD control unit 630 used for one of colors Y, M, C, K; however, these units are actually provided for each of the colors.

As described earlier, upon receiving a light beam, the synchronous sensor 83 outputs a synchronous detection signal XDETP to the pixel clock generating unit 610 and the synchronous-detection lighting control unit 620.

The pixel clock generating unit 610 generates a pixel clock signal PCLK synchronous with the synchronous detection signal XDETP and outputs the signal to the synchronous-detection lighting control unit 620 and the LD control unit 630. The pixel clock generating unit 610 includes a reference clock generator 611, a voltage controlled oscillator (VCO) clock generator 612, and a phase locked clock generator 617, and these units will be later described.

To first detect a synchronous detection signal XDETP, the synchronous-detection lighting control unit 620 turns on a laser diode forcibly lighting signal BD, has a laser diode of the LD unit 84 forcibly lighted through the LD control unit 630, and causes the laser diode to emit a light beam.

After detection of the synchronous detection signal XDETP, the synchronous-detection lighting control unit 620 generates, with the synchronous detection signal XDETP and the pixel clock signal PCLK, the laser diode forcibly lighting signal BD that lights a laser diode in such a timing that can certainly detect the synchronous detection signal XDETP without generating flare light and turns off the laser diode upon detection of the synchronous detection signal XDETP. The synchronous-detection lighting control unit 620 thereafter outputs the generated signal to the LD control unit 630.

The synchronous-detection lighting control unit 620 generates a laser diode light-amount-control timing signal APC with the synchronous detection signal XDETP and the pixel clock signal PCLK and outputs the signal to the LD control unit 630. The light-amount-control timing signal APC needs to be executed outside the image writing area, and the LD control unit 630 thus controls the amount of light into a target amount in a timing outside the image writing area.

The LD control unit 630 (examples of an acquiring unit and a light source control unit) controls lighting of a laser diode of the LD unit 84 according to image data synchronous with the laser diode forcibly lighting signal BD for synchronous detection, the light-amount-control timing signal APC, and the pixel clock signal PCLK, and controls emission of a light beam. The light beam emitted from the laser diode of the LD unit 84 scans on the photoconductor unit 40 as described earlier.

A polygon motor control unit 640 controls a polygon motor and rotates the motor at a predetermined number of rotations in response to a control signal from a printer control unit 650.

The operation panel 660 sends the content input to the operation panel 660 by a user to the printer control unit 650. Based on the content, the printer control unit 650 makes an overall control on the image forming apparatus 1. The operation panel 660 displays various kinds of information on the panel in response to an instruction of the printer control unit 650.

The printer control unit 650 (an example of determining unit) outputs image data (in specific, a target pixel composing the image data) to the LD control unit 630. The printer control unit 650 further outputs, to the LD control unit 630, a control signal (an example of determination result information) indicating whether the dot of the target pixel requires correction in the lighting time of the laser diode of the LD unit 84 and a control signal designating the amount of light in a light beam emitted from the laser diode of the LD unit 84.

For example, the printer control unit 650 determines whether a target dot of the target pixel among a plurality of pixels composing image data is: a first dot that needs emission of a light beam from the laser diode of the LD unit 84 with none of neighboring pixels adjacent in the main scanning direction having a neighboring dot that needs emission of a light beam from the laser diode, or a second dot that needs emission of a light beam from the laser diode with at least one of neighboring dots of the neighboring pixels that needs emission of a light beam from the laser diode, and that is moved close to the neighboring dot. The second dot is, for example, such a dot that needs emission of a light beam from the laser diode of the LD unit 84 with a neighboring dot of the neighboring pixel in the previous stage in the main scanning direction that needs emission of a light beam from the laser diode, and that is moved close to the neighboring dot.

The printer control unit 650 outputs the target pixel to the LD control unit 630. Furthermore, if the target dot is determined to be a first dot, the printer control unit 650 outputs, to the LD control unit 630, a control signal indicating that the dot needs correction in the lighting time of the laser diode, and if the target dot is determined to be a second dot, another control signal indicating that the dot needs no correction in the lighting time of the laser diode.

More specifically, the printer control unit 650 determines whether the target dot is a first dot, a second dot, or a third dot that needs emission of a light beam from the laser diode of the LD unit 84 with a neighboring dot of the neighboring pixel in the subsequent stage in the main scanning direction needing emission of a light beam from the laser diode and that is moved close to the neighboring dot.

The printer control unit 650 outputs the target pixel to the LD control unit 630; furthermore, if the target dot is determined to be the first dot or the third dot, the printer control unit 650 outputs, to the LD control unit 630, a control signal indicating that the dot needs correction in the lighting time of the laser diode and if the target dot is determined to be the second dot, the printer control unit 650 outputs, to the LD control unit 630, a control signal indicating that the dot needs no correction in the lighting time of the laser diode.

The pixel clock generating unit 610, the synchronous-detection lighting control unit 620, the LD control unit 630, the polygon motor control unit 640, and the printer control unit 650 may be implemented, for example, by using hardware such as an integrated circuit (IC) or may be implemented by using hardware, and software, which causes a processing device such as a central processing unit (CPU) to execute a program.

Figure 5:
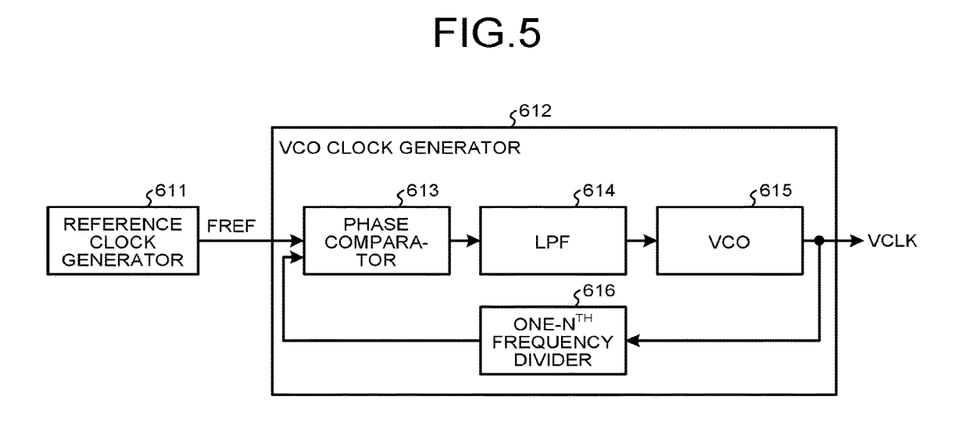
FIG. 5 is a block diagram that illustrates an exemplary detailed configuration of a pixel clock generating unit of the embodiment.

FIG. 5 is a block diagram that illustrates an exemplary detailed configuration of the pixel clock generating unit 610 of the embodiment.

The reference clock generator 611 outputs a reference clock signal FREF to the VCO clock generator 612.

The reference clock signal FREF and a signal where a one-$N^{th}$ frequency divider 616 of the VCO clock generator 612 divides a later-described oscillation frequency signal VCLK by N are input to a phase comparator 613 of the VCO clock generator 612. The phases at the falling edges of the respective signals are compared with each other, and the resulting error component is output to a low pass filter (LPF) 614 at constant current.

The LPF 614 removes unnecessary high-frequency components and noises from the input error component and outputs the error component to a voltage controlled oscillator (VCO) 615.

The VCO 615 outputs the oscillation frequency signal VCLK dependent on the output of the LPF 614 to the one-$N^{th}$ frequency divider 616 and the phase locked clock generator 617 (see FIG. 4).

The phase locked clock generator 617 generates a pixel clock signal PCLK synchronous with the synchronous detection signal XDETP based on the oscillation frequency signal VCLK and outputs the generated signal to the synchronous-detection lighting control unit 620 and the LD control unit 630.

With this configuration of the pixel clock generating unit 610, the printer control unit 650 (see FIG. 4) varies the frequency of the reference clock signal FREF and the division ratio: N, thereby varying the frequency of the oscillation frequency signal VCLK. The frequency of the pixel clock signal PCLK changes with a change in the frequency of the oscillation frequency signal VCLK.

Figure 6:
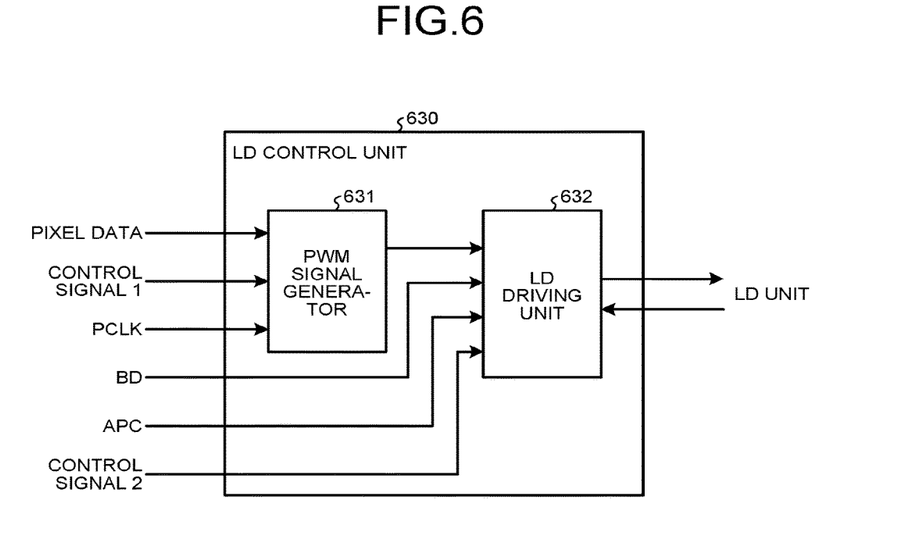
FIG. 6 is a block diagram that illustrates an exemplary detailed configuration of a laser diode (LD) control unit of the embodiment.

FIG. 6 is a block diagram that illustrates an exemplary detailed configuration of the LD control unit 630 of the embodiment. As FIG. 6 illustrates, the LD control unit 630 includes a pulse width modulation (PWM) signal generator 631 that controls the lighting time (luminescence of the light beam) of the laser diode and a laser diode (LD) driving unit 632 that controls lighting (controls emission of the light beam) of the laser diode of the LD unit 84.

The PWM signal generator 631 outputs a PWM signal to the LD driving unit 632 based on image data, the pixel clock signal PCLK and control signal. While the PWM signal is input from the PWM signal generator 631, the LD driving unit 632 lights the laser diode of the LD unit 84, and a light beam is accordingly emitted from the laser diode.

Figure 7:
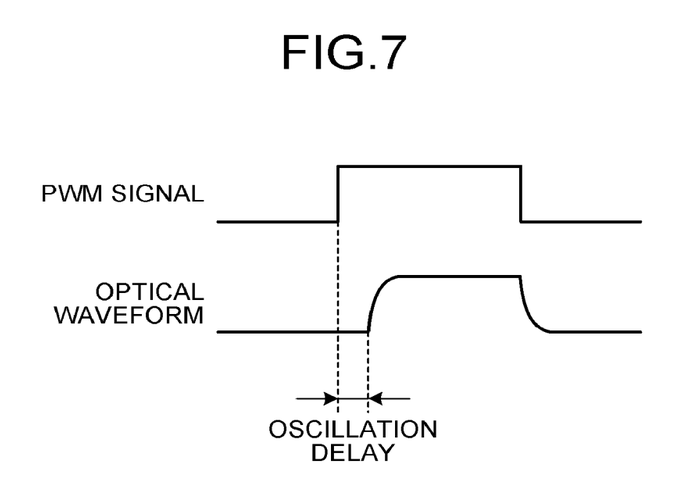
FIG. 7 is an illustrative drawing of an exemplary optical waveform of a laser diode of an LD unit of the embodiment.

FIG. 7 is an illustrative drawing of an exemplary optical waveform of the laser diode of the LD unit 84 of the embodiment. As FIG. 7 illustrates, when the laser diode of the LD unit 84 is lighted in response to the PWM signal from the PWM signal generator 631, the oscillation delay of the laser diode element causes a delay, which corresponds to the amount of the oscillation delay, on lighting of the laser diode and prevents emission of a light beam.

Figure 8:
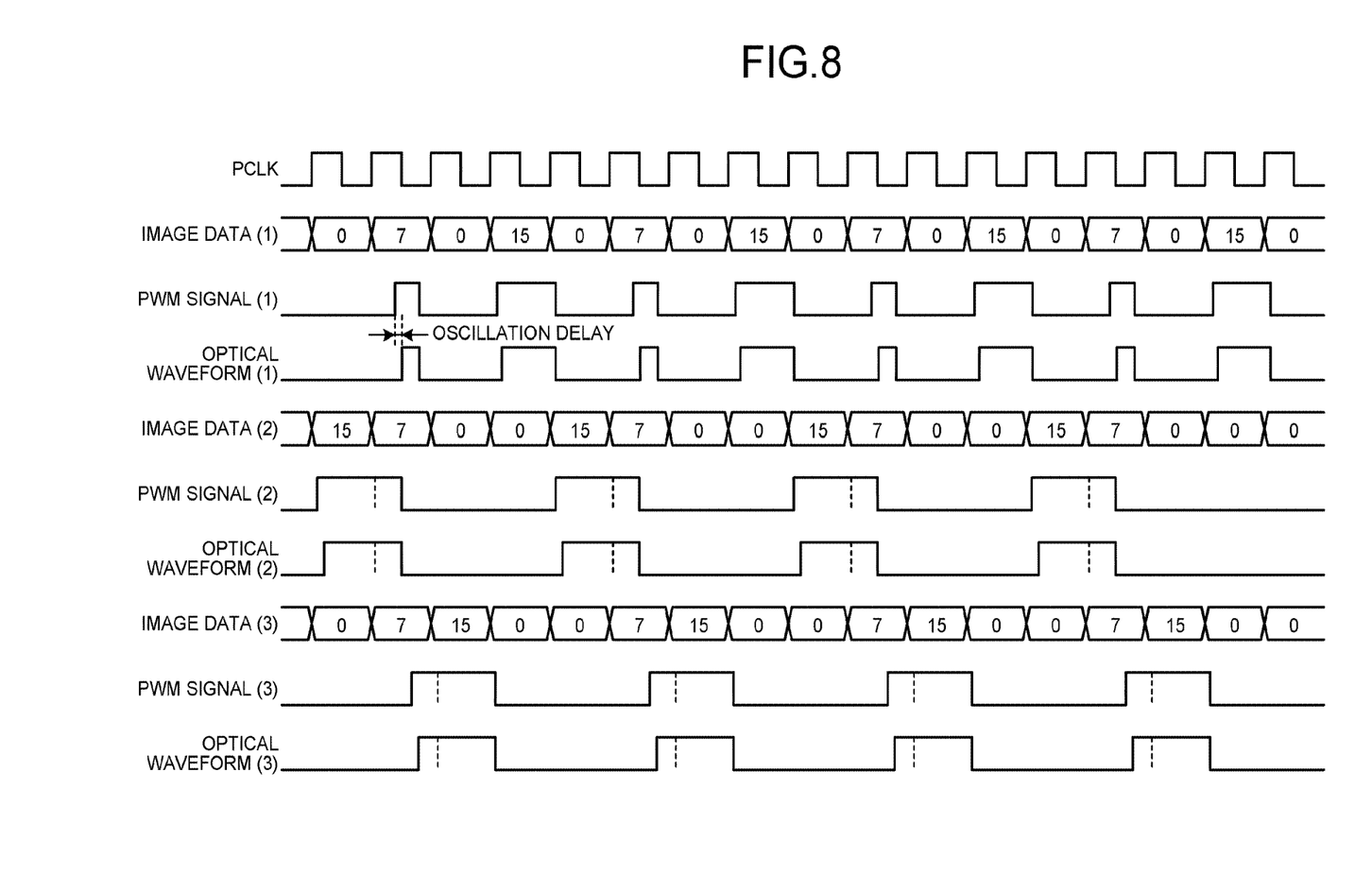
FIG. 8 is an illustrative drawing of an exemplary relation between the optical waveform illustrated in FIG. 7 and image data.

FIG. 8 is an illustrative drawing of an exemplary relation between the optical waveform illustrated in FIG. 7 and image data. In the example of FIG. 8, the image data is indicated with 4-bit width (16 values: 0, 1, 2, . . . , and 15); however, the embodiment is not limited to this bit width.

Image data (1) indicates lighting of isolated dots of image data 7 and 15. In this case, due to the oscillation delay, an optical waveform (1) indicating an actual lighting time of the laser diode is shorter than a desired lighting time in any image data.

Image data (2) indicates that a dot, which serves as a target dot, of the image data 7 is moved close to the neighboring image data 15 in the previous stage. The dot of the image data 15 is affected by the oscillation delay; however, the dot, which serves as a target dot, of the image data 7 is not affected by the oscillation delay, which results in a desired lighting time.

Image data (3) indicates that the dot, which serves as a target dot, of the image data 7 is moved close to the neighboring image data 15 in the subsequent stage. The dot, which serves as a target dot, of the image data 7 is affected by the oscillation delay; however, the dot of the image data 15 is not affected by the oscillation delay, which results in a desired lighting time.

Which dot is affected by the oscillation delay is different between the image data (2) and (3); however, the total amount of lighting time of the two dots is the same between the image data (2) and (3).

As described above, if a target dot is an isolated dot or is a previous (first) dot of successive dots, the lighting time is shorter than a desired lighting time due to the oscillation delay. In this case, in the embodiment, the lighting time of the laser diode is corrected.

Figure 9:
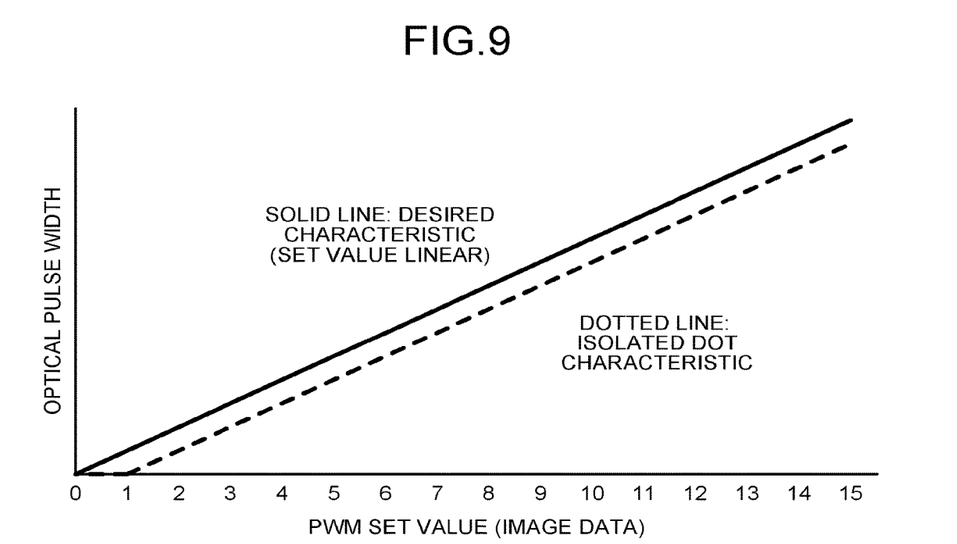
FIG. 9 is an illustrative drawing of an exemplary principle for correcting a lighting time of the embodiment.

FIG. 9 is an illustrative drawing of an exemplary principle for correcting the lighting time of the embodiment. In FIG. 9, such a case is described that a time of the oscillation delay corresponds to a desired lighting time in image data 1 described in FIG. 8; however, the embodiment is not limited to this case.

In this case, as the characteristic of the dot affected by the oscillation delay, the dot has a shorter optical pulse width compared with the optical pulse width in a desired characteristic, in other words, compared with the optical pulse width equal to the PWM set value (the PWM signal), by the amount corresponding to the image data 1. However, even with a dot affected by the oscillation delay, the dot can obtain the optical pulse width in a desired characteristic by adding 1 to the image data.

In the case that, for example, image data of a target dot is 5, if the dot is not affected by the oscillation delay, the PWM signal generator 631 generates a PWM signal having an optical pulse width directly corresponding to image data 5. If the dot is affected by the oscillation delay, the PWM signal generator 631 generates a PWM signal having an optical pulse width corresponding to image data 6. With this configuration, a laser diode of the LD unit 84 has the same lighting time regardless of whether the dot is affected by the oscillation delay. Light beams emitted from the laser diode have thus the same luminescent time.

Referring back to FIG. 6, as described earlier, the printer control unit 650 outputs a control signal indicating whether the dot needs correction in the lighting time of the laser diode to the LD control unit 630. The signal corresponds to a control signal 1. A target dot that needs correction in the lighting time of the laser diode is equivalent to a target dot affected by the oscillation delay, whereas a target dot that needs no correction in the lighting time of the laser diode is equivalent to a target dot not affected by the oscillation delay.

When the control signal 1 indicates that the dot needs no correction in the lighting time of the laser diode, the PWM signal generator 631 generates a PWM signal with an optical pulse width directly corresponding to the target dot serving as pixel data. When the control signal 1 indicates that the dot needs correction in the lighting time of the laser diode, the PWM signal generator 631 generates a PWM signal with an optical pulse width where an optical pulse width corresponding to a time of the oscillation delay is added to the optical pulse width of the target dot serving as pixel data.

In other words, if the target dot is a first dot, the PWM signal generator 631 has a laser diode of the LD unit 84 emit a light beam during a corrected lighting time where a light source characteristic time (the optical pulse width corresponding to a time of the oscillation delay) based on the characteristic of the laser diode of the LD unit 84 is added to a predetermined lighting time (the optical pulse width directly corresponding to the target dot) preliminarily determined for the target dot. If the target dot is a second dot, the PWM signal generator 631 causes the laser diode of the LD unit 84 to emit a light beam during the predetermined lighting time.

More specifically, if the target dot is the first dot or the third dot, the PWM signal generator 631 has the laser diode of the LD unit 84 emit a light beam during the corrected lighting time. If the target dot is the second dot, the PWM signal generator 631 has the laser diode of the LD unit 84 emit a light beam during the predetermined lighting time.

The optical pulse width corresponding to a time of the oscillation delay may be preliminarily set at a certain timing such as the time of shipment from the factory. In the case that the optical pulse width corresponding to a time of the oscillation delay is variable depending on time, for example, the printer control unit 650 may configure the PWM signal generator 631 such that the optical pulse width corresponding to a time of the oscillation delay can be changed in response to an operation input from the operation panel 660.

If the optical pulse width corresponding to a time of the oscillation delay is variable depending on the temperature, with a temperature sensor installed to the laser diode of the LD unit 84, the PWM signal generator 631 may change the optical pulse width corresponding to a time of the oscillation delay based on the temperature detected by the temperature sensor. In this case, it is preferable that the PWM signal generator 631 switch the optical pulse width not during image forming but between pages (between sheets) or before starting printing.

If the optical pulse width corresponding to a time of the oscillation delay is variable depending on the amount of light of a laser diode in the LD unit 84, the PWM signal generator 631 may change the optical pulse width corresponding to a time of the oscillation delay based on the set amount of light.

Image data may consist of 1 bit (binary) or of multiple bits (2-bit width or larger, ternary or greater). In the case of 1 bit, the optical pulse width directly corresponding to a target dot is a fixed width. In the case of multiple-bit width, the optical pulse width directly corresponding to a target dot is a width based on the target dot.

While the laser diode forcibly lighting signal BD is input from the synchronous-detection lighting control unit 620, the LD driving unit 632 lights a laser diode of the LD unit 84, and a light beam is accordingly emitted from the laser diode.

When the light-amount-control timing signal APC for executing the automatic power control (APC) operation on the laser diode of the LD unit 84 is input from the synchronous-detection lighting control unit 620, the LD driving unit 632 controls the amount of light of the laser diode.

A control signal 2 output from the printer control unit 650 determines the amount of light in lighting the laser diode.

Figure 10:
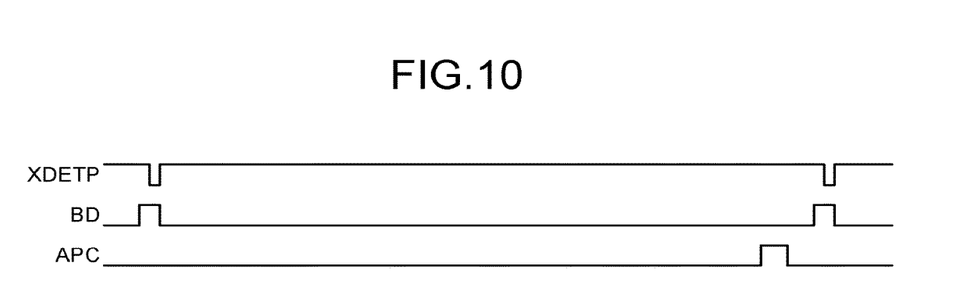
FIG. 10 is an illustrative drawing of an exemplary timing for performing an automatic power control (APC) operation of the embodiment.

FIG. 10 is an illustrative drawing of an exemplary timing for performing the APC operation of the embodiment.

The APC operation for controlling the amount of light into a determined amount needs to be executed in the non-image-writing area because the operation requires lighting. The synchronous-detection lighting control unit 620 generates the light-amount-control timing signal APC at a timing different from the timing for generating the laser diode forcibly lighting signal BD for detecting the synchronous detection signal XDETP and outputs the generated signal to the LD driving unit 632.

For example, a laser diode array having a plurality of lighting sources includes therein only a single photodiode (PD) for monitoring the amount of light. With this configuration, the APC operation needs to be executed in timings different between the light sources. The APC signal is therefore generated for each light source and output to the LD driving unit 632 at a timing different from one another.

Figure 11:
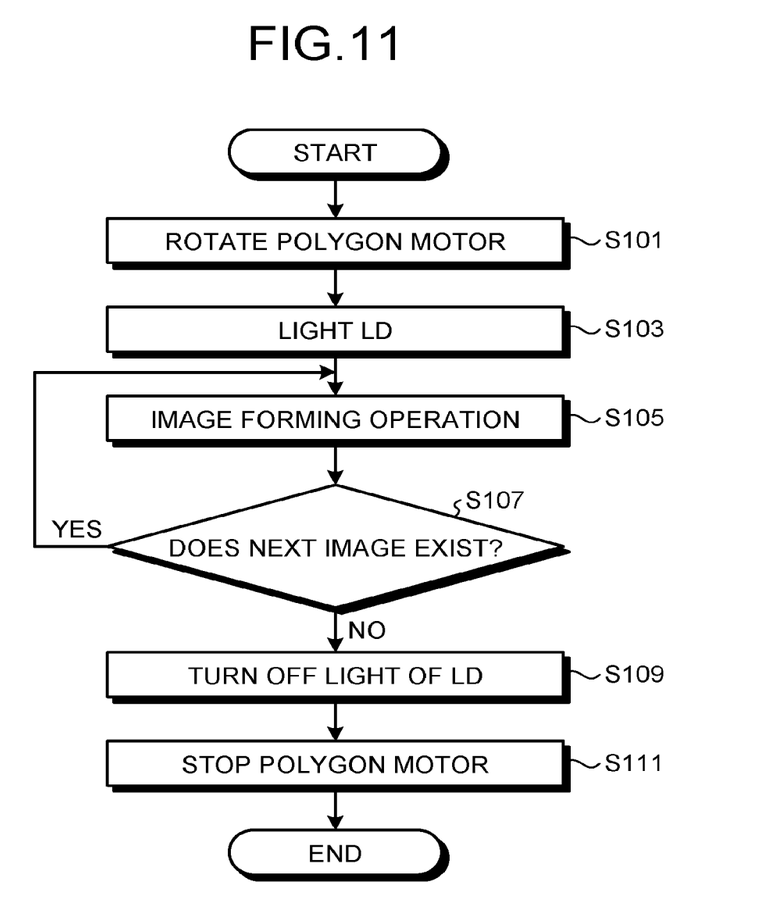
FIG. 11 is a flowchart that illustrates an exemplary flow in a processing procedure executed by the image forming apparatus of the embodiment.

FIG. 11 is a flowchart that illustrates an exemplary flow in a processing procedure executed by the image forming apparatus 1 of the embodiment.

When a start key on the operation panel 660 is pressed, the polygon motor control unit 640 rotates the polygon motor at a determined number of rotation in response to an instruction from the printer control unit 650 (Step S101).

The LD control unit 630 executes the forcible laser diode lighting for outputting the synchronous detection signal XDETP and the APC operation for causing the laser diode to light in a determined amount of light (Step S103).

The image forming operation is performed while waiting images exist (Steps S105, Yes at S107). As illustrated in FIGS. 6 to 9, during the image forming operation, the PWM signal generator 631 generates the PWM signal with an optical pulse width determined based on whether the dot is a target dot that needs correction in the lighting time of the laser diode or a target dot that needs no correction. While the PWM signal is input from the PWM signal generator 631, the LD driving unit 632 lights the laser diode of the LD unit 84, and a light beam is accordingly emitted from the laser diode.

When the image forming operation ends (No at Step S107), the LD control unit 630 turns off the light of the laser diode of the LD unit 84 (Step S109), and the polygon motor control unit 640 stops the polygon motor (step S111).

In the embodiment as described above, if a target dot is affected by the oscillation delay, the PWM signal is generated with such an optical pulse width that eliminates effects of the oscillation delay, and a light beam is emitted from the laser diode. According to the embodiment, the laser diode has the same lighting time for an identical target dot regardless of whether the target dot is affected by the oscillation delay. Light beams emitted from the laser diode accordingly have the same luminescent time. This configuration therefore can improve the gradation of an image.

According to the present invention, such an advantageous effect is exerted that can improve the gradation of an image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A scanner comprising:
   circuitry configured to
   acquire determination result information based on a determination result of whether a target dot of a target pixel of a plurality of pixels constituting image data is a first dot that needs emission of a light beam from a light source with none of neighboring pixels adjacent in a main scanning direction having a neighboring dot that needs emission of a light beam from the light source, or a second dot that needs emission of a light beam from the light source with at least one of neighboring dots of the neighboring pixels needing emission of a light beam from the light source, and is moved close to the neighboring dot,
   cause the light source to emit a light beam during a corrected lighting time with a light source characteristic time based on a characteristic of the light source being added to a predetermined lighting time that is preliminarily determined with respect to the target dot, in response to the target dot being the first dot,
   cause the light source to emit a light beam during the predetermined lighting time in response to the target dot being the second dot, the light source characteristic time being determined based on a time delay between a rising edge of a signal to turn on the light source to emit the light beam and a rising edge of the light beam emitted in response to the signal, and
   deflect the light beam in the main scanning direction.

2. The scanner according to claim 1, wherein the second dot needs emission of a light beam from the light source, a neighboring dot of a neighboring pixel in a previous stage in the main scanning direction needs emission of a light beam from the light source, and is moved close to the neighboring dot.

3. The scanner according to claim 2, wherein
   the determination result information is information based on a determination result of whether the target dot is the first dot, the second dot, or a third dot, the third dot needing emission of a light beam from the light source with a neighboring dot of a neighboring pixel in a subsequent stage in the main scanning direction needing emission of a light beam from the light source, and being moved close to the neighboring dot, and the circuitry is further configured to cause the light source to emit a light beam during the corrected lighting time in response to the target dot being the first dot or the third dot, and cause the light source to emit a light beam during the predetermined lighting time in response to the target dot being the second dot.

4. The scanner according to claim 1, wherein the light source characteristic time is preliminarily determined.

5. The scanner according to claim 1, wherein the light source characteristic time is determined based on a temperature of the light source or a temperature near the light source.

6. The scanner according to claim 1, wherein the light source characteristic time is determined based on an amount of light of the light source.

7. The scanner according to claim 1, wherein the light source characteristic time is determined based on an operation input from an operation panel.

8. The scanner according to claim 5, wherein the circuitry is further configured to determine the corrected lighting time before starting printing or between sheets.

9. The scanner according to claim 6, wherein the circuitry is further configured to determine the corrected lighting time before starting printing or between sheets.

10. The scanner according to claim 7, wherein the circuitry is further configured to determine the corrected lighting time before starting printing or between sheets.

11. An image forming apparatus according to claim 1, comprising:

the scanner of claim 1; and circuitry configured to determine whether the target dot is the first dot or the second dot.

12. A scanning method performed by a scanner, comprising:

acquiring determination result information based on a determination result of whether a target dot of a target pixel of a plurality of pixels constituting image data is a first dot that needs emission of a light beam from a light source with none of neighboring pixels adjacent in a main scanning direction having a neighboring dot that needs emission of a light beam from the light source, or a second dot that needs emission of a light beam from the light source with at least one of neighboring dots of the neighboring pixels needing emission of a light beam from the light source, and is moved close to the neighboring dot;

in response to the target dot being the first dot, causing the light source to emit a light beam during a corrected lighting time with a light source characteristic time based on a characteristic of the light source being added to a predetermined lighting time that is preliminarily determined with respect to the target dot;

in response to the target dot being the second dot, causing the light source to emit a light beam during the predetermined lighting time, the light source characteristic time being determined based on a time delay between a rising edge of a signal to turn on the light source to emit the light beam and a rising edge of the light beam emitted in response to the signal; and deflecting the light beam in the main scanning direction.

13. A scanner comprising:

acquiring means for acquiring determination result information based on a determination result of whether a target dot of a target pixel of a plurality of pixels constituting image data is a first dot that needs emission of a light beam from a light source with none of neighboring pixels adjacent in a main scanning direction having a neighboring dot that needs emission of a light beam from the light source, or a second dot that needs emission of a light beam from the light source with at least one of neighboring dots of the neighboring pixels needing emission of a light beam from the light source, and is moved close to the neighboring dot;

light source control means for, causing the light source to emit a light beam during a corrected lighting time with a light source characteristic time based on a characteristic of the light source being added to a predetermined lighting time that is preliminarily determined with respect to the target dot, in response to the target dot being the first dot, and causing the light source to emit a light beam during the predetermined lighting time in response to the target dot being the second dot, the light source characteristic time being determined based on a time delay between a rising edge of a signal to turn on the light source to emit the light beam and a rising edge of the light beam emitted in response to the signal; and deflecting means for deflecting the light beam in the main scanning direction.

* * * * *